(12) United States Patent
Chang et al.

(10) Patent No.: US 8,774,122 B2
(45) Date of Patent: Jul. 8, 2014

(54) SYMBOL TIMING SYNCHRONIZATION OBTAINING METHOD AND APPARATUS ROBUST TO FREQUENCY OFFSET IN CELL SEARCH OF WIRELESS COMMUNICATION SYSTEM

(75) Inventors: Kapseok Chang, Daejeon (KR); Young-Hoon Kim, Daejeon (KR); Seong Rag Kim, Daejeon (KR); Seuck Ho Won, Daejeon (KR); Keun Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 278 days.

(21) Appl. No.: 12/991,517

(22) PCT Filed: May 8, 2009

(86) PCT No.: PCT/KR2009/002422
§ 371 (c)(1),
(2), (4) Date: Nov. 8, 2010

(87) PCT Pub. No.: WO2009/136753
PCT Pub. Date: Nov. 12, 2009

(65) Prior Publication Data
US 2011/0058528 A1    Mar. 10, 2011

(30) Foreign Application Priority Data

May 9, 2008  (KR) .................. 10-2008-0043423
Dec. 19, 2008 (KR) .................. 10-2008-0130231

(51) Int. Cl.
*H04W 4/00* (2009.01)
*H04L 27/26* (2006.01)

(52) U.S. Cl.
CPC ......... *H04L 27/2662* (2013.01); *H04L 27/2657* (2013.01); *H04L 27/2684* (2013.01)
USPC .................. 370/330; 370/324; 370/350

(58) Field of Classification Search
USPC ............... 370/229, 310, 498, 465, 208, 300; 379/1.01, 28, 562; 375/260; 455/436, 455/101, 522, 69
See application file for complete search history.

(56) References Cited

U.S. PATENT DOCUMENTS 5,450,456 A * 9/1995 Mueller ................. 375/224
(Continued)

FOREIGN PATENT DOCUMENTS

EP     1414208 A1    4/2004
(Continued)

OTHER PUBLICATIONS

T. M. Schmidl et al., "Robust frequency and timing synchronization for OFDM", IEEE Transactions on Communications, Dec. 1997, vol. 54, No. 12, pp. 1613-1621.
(Continued)

*Primary Examiner* — Andrew Lai
*Assistant Examiner* — Jamaal Henson
(74) *Attorney, Agent, or Firm* — Rabin & Berdo, P.C.

(57) ABSTRACT

Disclosed is a symbol synchronization obtaining apparatus robust to a frequency offset in a cell search of a wireless communication system. The symbol synchronization obtaining apparatus robust to a frequency offset in a cell search of a wireless communication system may include a sequence generator to generate a base sequence for obtaining the symbol synchronization, a synchronization pattern generator to generate a modified sequence based on the base sequence, and to generate a synchronization pattern by combining the modified sequence and the base sequence, a frequency mapping unit to perform mapping of transmission information to a time area and a frequency area, based on the synchronization pattern, for generating a transmission frame, and a transmitting unit to transmit the transmission frame.

11 Claims, 11 Drawing Sheets

(56) References Cited

U.S. PATENT DOCUMENTS

| | | |
|---|---|---|
| 7,139,320 B1 | 11/2006 | Singh et al. |
| 2005/0084035 A1 | 4/2005 | Kim et al. |
| 2006/0067256 A1* | 3/2006 | Alazraki et al. ............ 370/300 |
| 2007/0082692 A1* | 4/2007 | Tirkkonen et al. ........... 455/522 |
| 2009/0073929 A1* | 3/2009 | Malladi et al. ............... 370/329 |
| 2009/0201872 A1* | 8/2009 | Gorokhov et al. ............ 370/329 |

FOREIGN PATENT DOCUMENTS

| | | |
|---|---|---|
| KR | 20020089793 A | 11/2002 |
| KR | 20030074812 A | 9/2003 |
| KR | 20070073670 A | 7/2007 |
| KR | 10-0786161 A | 8/2007 |
| WO | WO-00/59147 A1 | 10/2000 |
| WO | WO-2006-099222 A1 | 9/2006 |
| WO | WO-2007/055531 A2 | 5/2007 |
| WO | WO-2007/138666 A1 | 12/2007 |
| WO | WO-2008/026819 A1 | 3/2008 |
| WO | WO-2008/042874 A2 | 4/2008 |

OTHER PUBLICATIONS

K. Chang et al., "Robust replica correlation-based symbol synchronisation in OFDM systems", Electronics Letters, Aug. 14, 2008, vol. 44, No. 17, pp. 1024-10251.

NTT DoCoMo et al., "Cell Search Time Performance of Three-Step Cell Search Method", 3GPP TSG-RAN-WGI, R1-060781, Mar. 27, 2006, retrieved from the Internet: URL:http://www.3gpp.org/ftp/tsg_ran/WG1_RL1/TSGRI_44bis/Docs/R1-060781.zip.

* cited by examiner

SYMBOL TIMING SYNCHRONIZATION OBTAINING METHOD AND APPARATUS ROBUST TO FREQUENCY OFFSET IN CELL SEARCH OF WIRELESS COMMUNICATION SYSTEM

TECHNICAL FIELD

The present invention relates to a cell search apparatus and method of obtaining symbol synchronization of a wireless communication system, and discloses an apparatus and a method of generating and assigning a sequence for obtaining symbol synchronization, the apparatus and method being robust to a frequency offset.

BACKGROUND ART

A first action that a mobile station performs is obtaining symbol synchronization to perform initial access to a predetermined wireless communication system. The present invention relates to the obtaining of the symbol synchronization.

According to a conventional method of obtaining symbol synchronization in an orthogonal frequency division multiplexing (OFDM) system, a transmitting base station assigns a single base sequence to a frequency resource available in a frequency area of a synchronization channel, and a receiving mobile station measures a correlation value between a time area signal of the synchronization channel and a received signal of the time area and regards a sample time having a highest correlation value as a symbol synchronization time.

However, according to the conventional method, performance of obtaining synchronization is deteriorated in an environment where a frequency offset is high.

Also, according to a conventional wireless communication system excluding a system based on the OFDM system, when a base sequence is assigned to a symbol section used for obtaining synchronization of a time area symbol, a size of the base sequence is required to be regular. However, according to the method of assigning the sequence having the regular size, performance of obtaining synchronization is also deteriorated in the environment where the frequency offset is high.

Accordingly, there is need for a frequency offset estimating apparatus and method that performs estimating of symbol synchronization as efficient as the conventional method in an environment where the frequency offset is small, and also performs estimating of the symbol synchronization better than the conventional method in an environment where the frequency offset is large.

DISCLOSURE OF INVENTION

Technical Goals

An aspect of the present invention provides a symbol synchronization obtaining apparatus robust to a frequency offset in a cell search of a wireless communication system that combines a base sequence and a sequence modified based on the base sequence to generate a synchronization pattern for obtaining symbol synchronization, and assigns the synchronization pattern to a synchronization channel, thereby efficiently estimating symbol synchronization in an environment having a relatively high frequency offset and preventing increase of a peak to average power ratio (PAPR) of a transmitting apparatus.

Another aspect of the present invention also provides a symbol synchronization obtaining apparatus robust to a frequency offset in a cell search of a wireless communication system that combines a base sequence and a sequence modified based on the base sequence to generate a synchronization pattern for obtaining symbol synchronization, and assigns the synchronization pattern to a synchronization channel, thereby efficiently estimating symbol synchronization and reducing a complexity of a receiving apparatus, even though a PAPR increases by a small amount.

Technical Solutions

According to an aspect of an exemplary embodiment, there is provided an apparatus of transmitting a symbol synchronization by obtaining the symbol synchronization, the apparatus being robust to a frequency offset in a cell search in a wireless communication system, including a sequence generator to generate a base sequence used for obtaining the symbol synchronization, a synchronization pattern generator to generate a modified sequence based on the base sequence and to generate a synchronization pattern by combining the modified sequence and the base sequence, a frequency mapping unit to perform mapping of transmission information to a time area and a frequency area, based on the synchronization pattern, for generating a transmission frame, and a transmitting unit to transmit the transmission frame.

In this instance, the synchronization pattern generator may perform complex-conjugation of an element of the base sequence to generate the modified sequence.

In this instance, the synchronization pattern generator may multiply an element of the base sequence by '−1' to generate the modified sequence.

In this instance, the synchronization pattern generator may multiply an element of a complex-conjugated base sequence by '−1' to generate the modified sequence.

According to another aspect of an exemplary embodiment, there is provided a method of transmitting a symbol synchronization by obtaining the symbol synchronization, the method being robust to a frequency offset in a cell search in a wireless communication system, including generating a base sequence used for obtaining the symbol synchronization, generating a modified sequence based on the base sequence, generating a synchronization pattern by combining the modified sequence and the base sequence, generating a transmission frame by mapping transmission information to a time area and a frequency area based on the synchronization pattern, and transmitting the transmission frame.

Advantageous Effect

Example embodiments of the present invention combine a base sequence and a sequence modified based on the base sequence to generate a synchronization pattern for obtaining symbol synchronization, and assign the synchronization pattern to a synchronization channel, thereby efficiently estimating symbol synchronization in an environment having a relatively large frequency offset and preventing an increase of a peak to average power ratio (PAPR) of a transmitting apparatus.

Also, example embodiments of the present invention combine a base sequence and a sequence modified based on the base sequence to generate a synchronization pattern for obtaining symbol synchronization, and assign the synchronization pattern to a synchronization channel, thereby efficiently estimating symbol synchronization and reducing a complexity of a receiving apparatus, even though a PAPR increases by a small amount.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
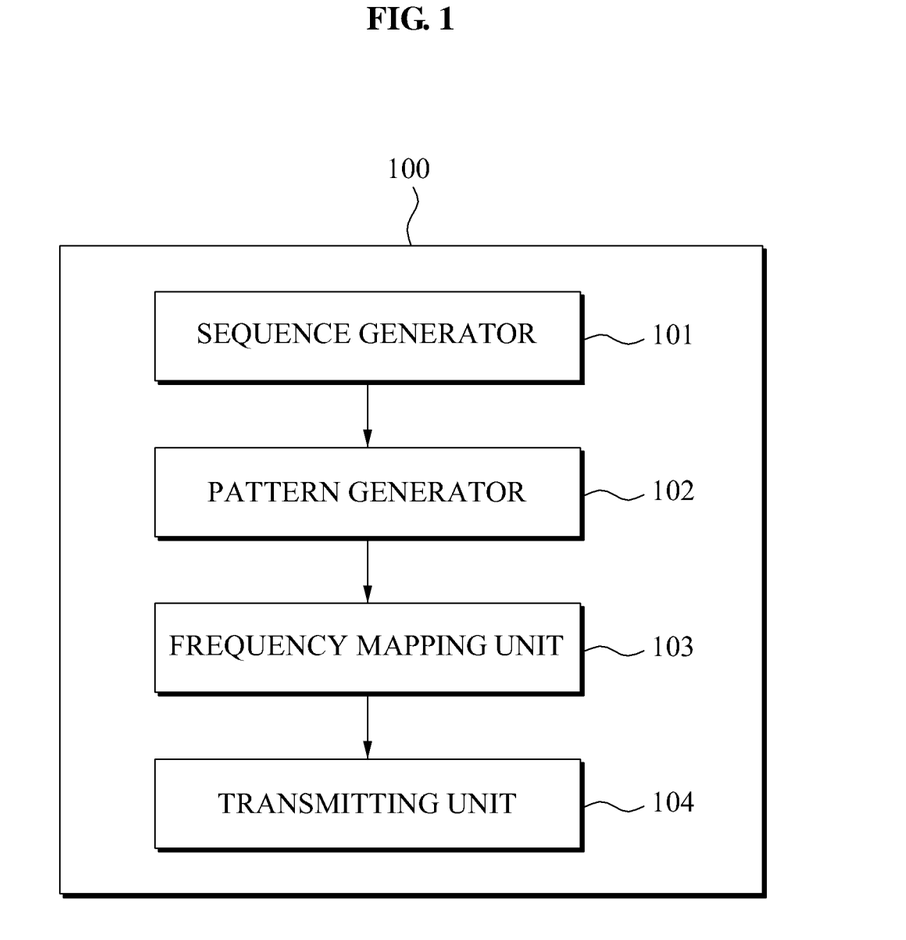
FIG. 1 is a recapitulative diagram illustrating a symbol synchronization obtaining and transmitting apparatus robust to a frequency offset in a cell search of a wireless communication system according to an embodiment of the present invention.

FIG. 1 is a recapitulative diagram illustrating a symbol synchronization obtaining and transmitting apparatus robust to a frequency offset in a cell search of a wireless communication system according to an embodiment of the present invention.

Referring to FIG. 1, in the symbol synchronization obtaining and transmitting apparatus 100 robust to the frequency offset in a cell search of the wireless communication system according to an embodiment of the present invention, a sequence generator 101 generates a base sequence for obtaining symbol synchronization, a Pattern Generator in FIG. 1] 102 generates a modified sequence based on the base sequence and combines the modified sequence and the base sequence to generate a synchronization pattern, and a frequency mapping unit 103 performs mapping of transmission information to be transmitted to the synchronization pattern to a time area and a frequency area to generate a transmission frame, and a transmitting unit 104 transmits the transmission frame.

In this instance, the base sequence for obtaining a time synchronization generated by the sequence generator 101 may be a binary sequence or a complex-sequence, and the sequence generator 101 may generate a sequence for identifying a cell group/cell/frame synchronization.

In this instance, the synchronization pattern generator 102 may generate the synchronization pattern of a synchronization channel using the sequence for identifying the cell group/cell/frame synchronization. In this instance, the synchronization pattern generator 102 may generate a pilot pattern of a downlink signal that assigns, to a pilot channel, a unique scrambling sequence that is assigned for each cell for encoding a common pilot symbol and data symbol in a cellular system.

Also, the synchronization pattern generator 102 may variously set a ratio between the base sequence and the modified sequence included in the synchronization pattern, for generating the synchronization pattern. As an example the synchronization pattern generator 102 may set the ratio between the base sequence and the modified sequence included in the synchronization pattern to 1:1, thereby enabling the base sequence to use half a frequency resource that is used by the synchronization channel for estimating the symbol synchronization, the synchronization channel being included in the transmission frame, or may assign 1/m of the frequency resource to the base sequence and assign remaining frequency to the modified sequence. In this instance, m may be an integer equal to or greater than two.

Also, the synchronization pattern generator 102 may apply various methods to the base sequence to generate the modified sequence.

As an example, the synchronization pattern generator 102 may perform complex-conjugation of an element of the base sequence to generate the modified sequence, may multiply the element of the base sequence by '−1' to generate the modified sequence, and may multiply the element of the complex-conjugated base sequence by '−1' to generate the modified sequence.

Also, a method where the synchronization pattern generator 102 combines the modified sequence and the base sequence to generate the synchronization pattern will be described in detail with reference to FIGS. 2 through 7. While FIGS. 2 through 7 describe that a sequence element is assigned to a DC sub-carrier, the description is only an example and it is kept in mind that the sequence element cannot be assigned to the DC sub-carrier, or the assigned value of the DC sub-carrier can be set to be zero even though a sequence element is assigned to the DC sub-carrier.

In this instance, the frequency mapping unit 103 may generate a transmission frame in a form of a downlink frame by mapping of the transmission information to a time area and a frequency area using the synchronization pattern and the pilot pattern generated from the synchronization pattern generator 102 and transmission traffic data and frame control information transmitted from an outside.

In this instance, the frequency mapping unit 103 may assign the synchronization pattern generated from the synchronization pattern generator 102 to the synchronization channel.

Also, the frequency mapping unit 103 may set a size pattern of a time area signal of a synchronization channel symbol section not to be a flat shape, the synchronization channel symbol section being a section where the transmission information is mapped to the time area and the frequency area.

In this instance, the size pattern of the time area signal of the synchronization channel symbol section will be described in detail with reference to FIG. 8.

The transmitting unit 104 may receive the transmission frame from the frequency mapping unit 103 and may transmit the received transmission frame via a transmission antenna. In this instance, the transmitting unit 104 may be an orthogonal frequency division multiplexing (OFDM) transmitter.

Figure 2:
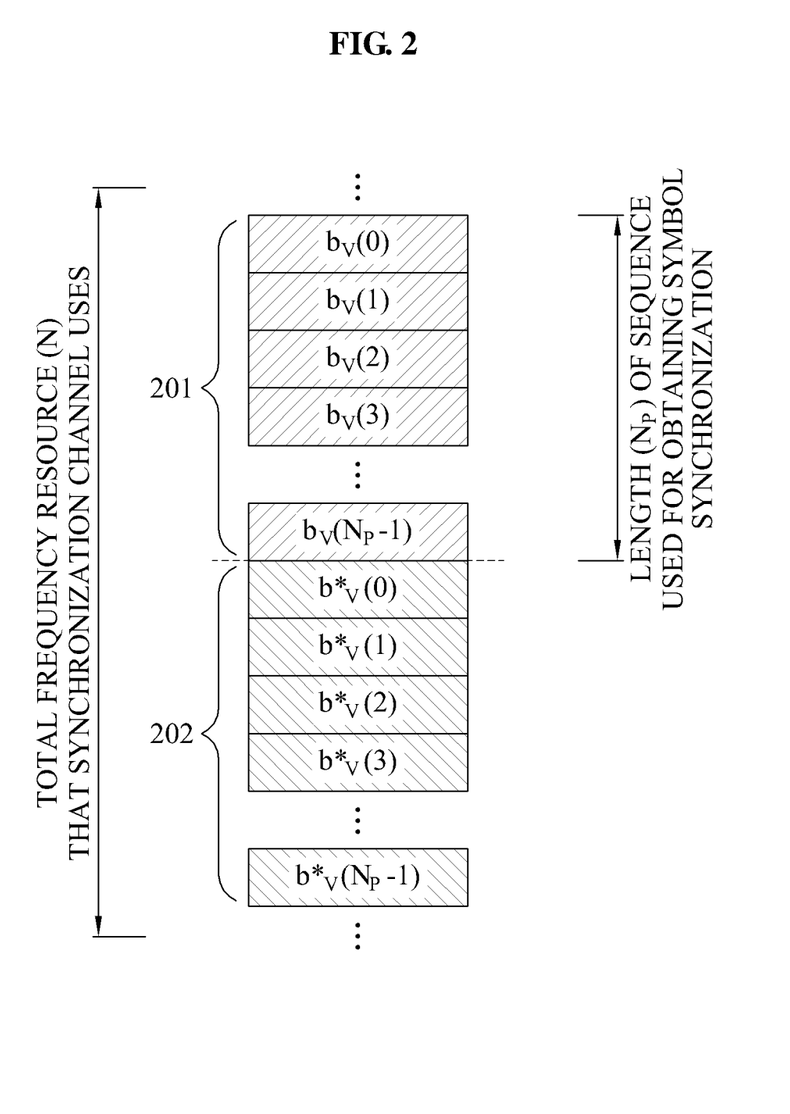
FIG. 2 is a diagram illustrating a state where a sequence element is assigned to a transmission frame according to a synchronization pattern generated, according to a first example embodiment.

FIG. 2 is a diagram illustrating a state where a sequence element is assigned to a transmission frame according to a synchronization pattern generated, according to a first example embodiment.

As illustrated in FIG. 2, the synchronization pattern generated according to a first example embodiment of the present invention may assign a Zadoff-Chu (ZC) sequence $b_V(k)$ having $N_P$ as a prime number, as a base sequence $b_V(k)$ 201, to an upper sub-carrier for transmitting a synchronization channel. In this instance, the base sequence $b_V(k)$ 201 may be calculated based on Equation 1 as given below.

$$b_V(k) = e^{-j\frac{\pi V k(k+1)}{N_P}}, k = 0, 1, \ldots, N_P - 1 \quad \text{[Equation 1]}$$

In this instance, V indicates a sequence index, $N_P$ indicates a length of a sequence for obtaining symbol synchronization, and N indicates a total frequency resource used by the synchronization channel.

Also, as illustrated in FIG. 2, the synchronization pattern generated according to the first example embodiment of the present invention may assign $b_V^*(k)$ 202 generated by conjugating ('*') the base sequence $b_V(k)$ 201 as a modified sequence $c_V(k)$ to a lower sub-carrier for transmitting the synchronization channel. In this instance, the modified sequence $c_V(k)$ may be calculated based on Equation 2 as given below.

$$c_V(k) = (b_V(k - N_p))^* = e^{j\frac{\pi V(k-N_p)(k-N_p+1)}{N_p}}, N_G - 1 \quad \text{[Equation 2]}$$

In this instance, $N_G$ indicates a prime number of a complex-sequence, and N may or may not be identical to $N_G$.

Figure 3:
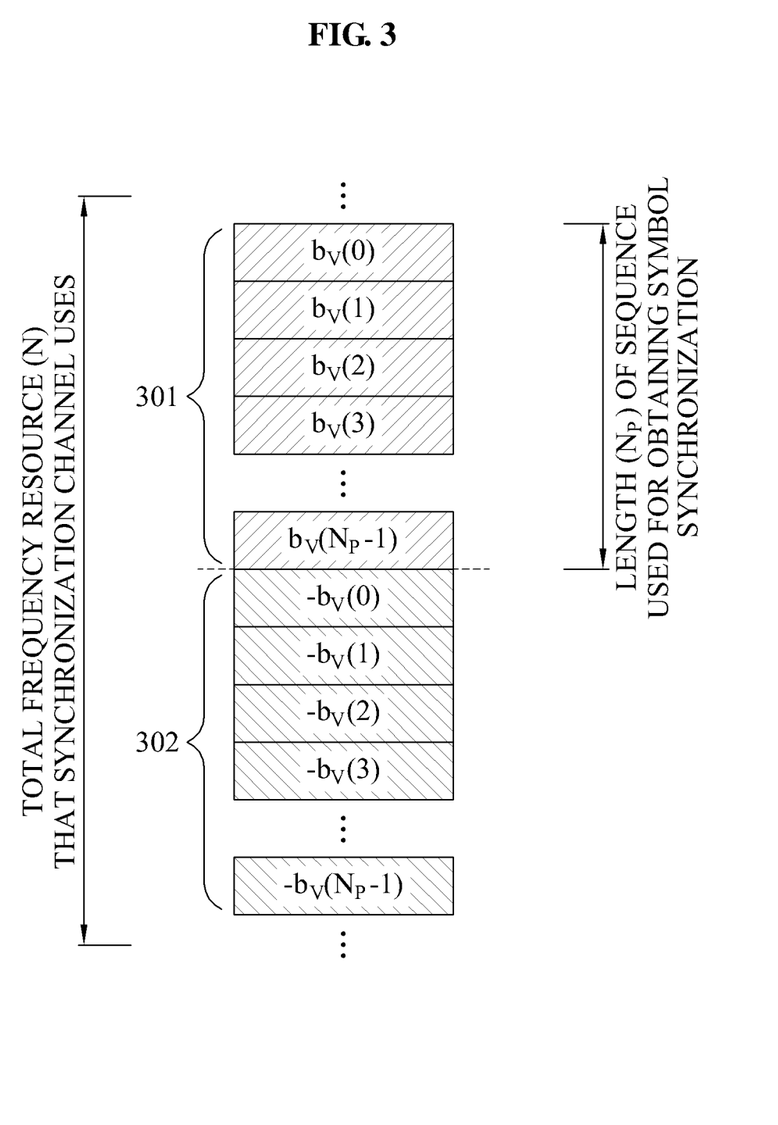
FIG. 3 is a diagram illustrating a state where a sequence element is assigned to a transmission frame according to a synchronization pattern generated, according to a second example embodiment.

FIG. 3 is a diagram illustrating a state where a sequence element is assigned to a transmission frame according to a synchronization pattern generated, according to a second example embodiment As illustrated in FIG. 3, the synchronization pattern generated according to the second example embodiment of the present invention may assign a base sequence $b_V(k)$ 301 calculated according to Equation 1 to an upper sub-carrier for transmitting a synchronization channel, and assign $-b_V(k)$ 302 generated by multiplying the base sequence $b_V(k)$ 301 by '-1' as a modified sequence $c_V(k)$ to a lower sub-carrier for transmitting the synchronization channel. In this instance, the modified sequence $c_V(k)$ may be calculated based on Equation 3 as given below.

$$c_V(k) = -(b_V(k - N_p)) = -e^{-j\frac{\pi V(k-N_p)(k-N_p+1)}{N_p}}, \quad \text{[Equation 3]}$$
$$k = N_p, N_p + 1, \ldots, N_G - 1$$

Figure 4:
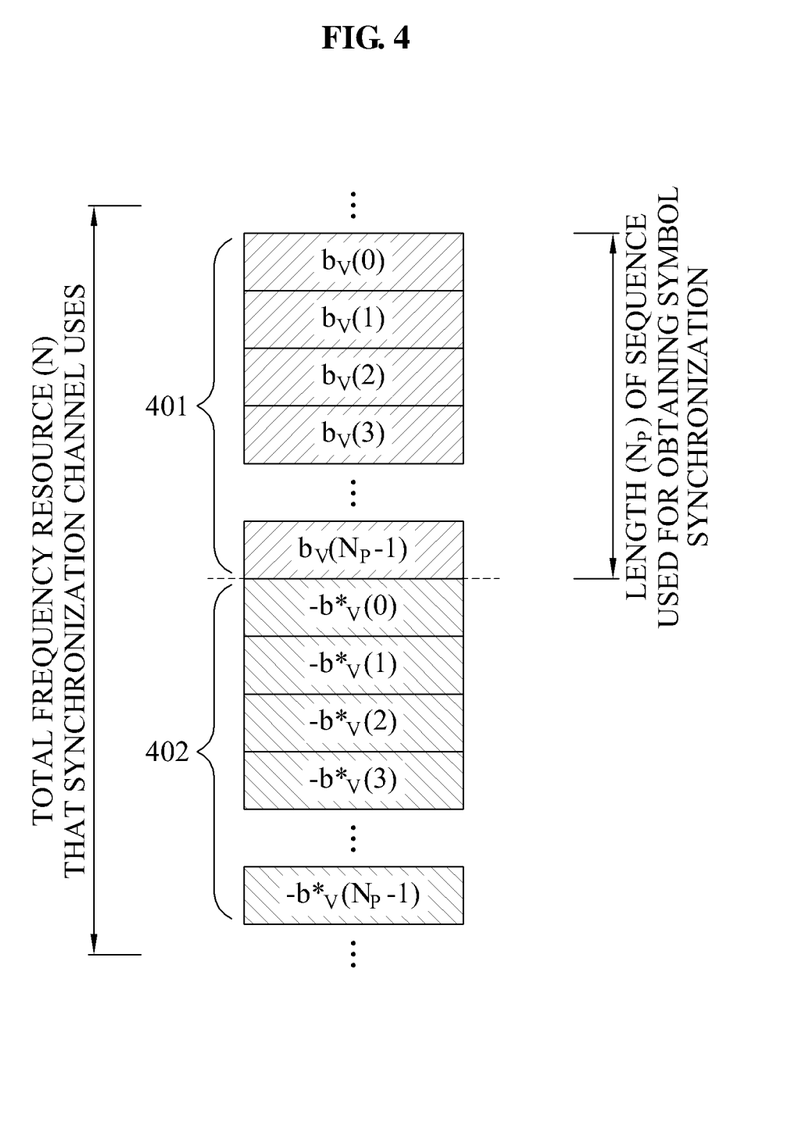
FIG. 4 is a diagram illustrating a state where a sequence element is assigned to a transmission frame according to a synchronization pattern generated, according to a third example embodiment.

FIG. 4 is a diagram illustrating a state where a sequence element is assigned to a transmission frame according to a synchronization pattern generated, according to a third example embodiment.

As illustrated in FIG. 4 the synchronization pattern generated according to the third example embodiment of the present invention may assign a base sequence $b_V(k)$ 401 calculated according to Equation 1 to an upper sub-carrier for transmitting a synchronization channel, and assign $-b_V(k)$ 402 generated by multiplying a conjugated base sequence $b_V(k)$ 401 by '-1' as a modified sequence $c_V(k)$ to a lower sub-carrier for transmitting the synchronization channel. In this instance, the modified sequence $c_V(k)$ may be calculated based on Equation 4 as given below.

$$c_V(k) = -(b_V(k - N_p))^* = -e^{j\frac{\pi V(k-N_p)(k-N_p+1)}{N_p}}, \quad \text{[Equation 4]}$$
$$k = N_p, N_p + 1, \ldots, N_G - 1$$

Figure 5:
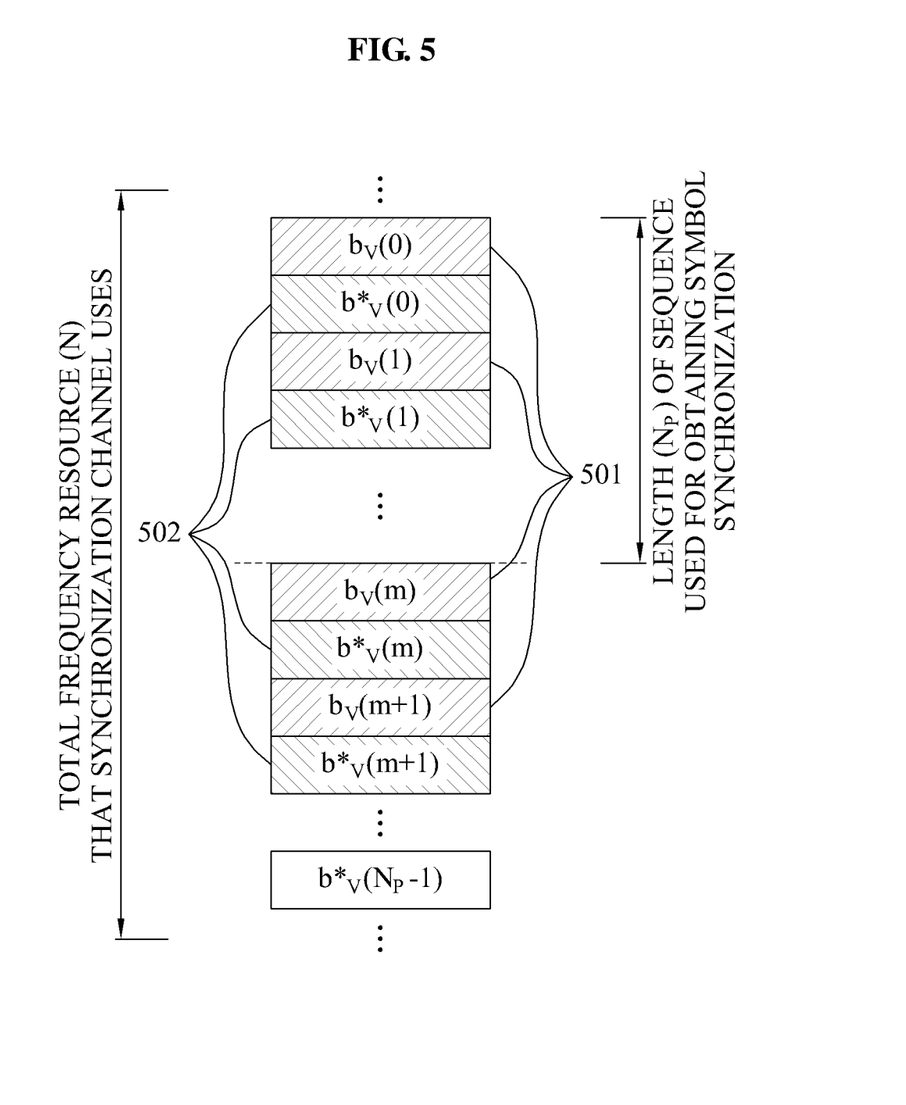
FIG. 5 is a diagram illustrating a state where a sequence element is assigned to a transmission frame according to a synchronization pattern generated, according to a fourth example embodiment.

FIG. 5 is a diagram illustrating a state where a sequence element is assigned to a transmission frame according to a synchronization pattern generated, according to a fourth example embodiment.

As illustrated in FIG. 5, the synchronization pattern generated according to the fourth example embodiment of the present invention may assign a Zadoff-Chu (ZC) sequence $b_V(k)$ having $N_P$ as a prime number, as a base sequence $b_V(k)$ 501, to an even-numbered positioned sub-carrier for transmitting a synchronization channel. In this instance, the base sequence $b_V(k)$ 501 may be calculated based on Equation 5 as given below.

$$b_V(k) = e^{-j\frac{\pi V \lfloor k/2 \rfloor(\lfloor k/2 \rfloor+1)}{N_P}}, k = 0, 2, 4, \ldots \quad \text{[Equation 5]}$$

Also, as illustrated in FIG. 5, the synchronization pattern generated according to the fourth example embodiment of the present invention may assign $b_V^*(k)$ 502 generated by conjugating ('*') the base sequence $b_V(k)$ 501 as a modified sequence $c_V(k)$ to an odd-numbered positioned sub-carrier for transmitting the synchronization channel. In this instance, the modified sequence $c_V(k)$ may be calculated based on Equation 6 as given below.

$$c_V(k) = (b_V(k-1))^* = e^{j\frac{\pi V \lfloor k/2 \rfloor(\lfloor k/2 \rfloor+1)}{N_P}}, \quad \text{[Equation 6]}$$
$$k = 1, 3, 5, \ldots$$

Figure 6:
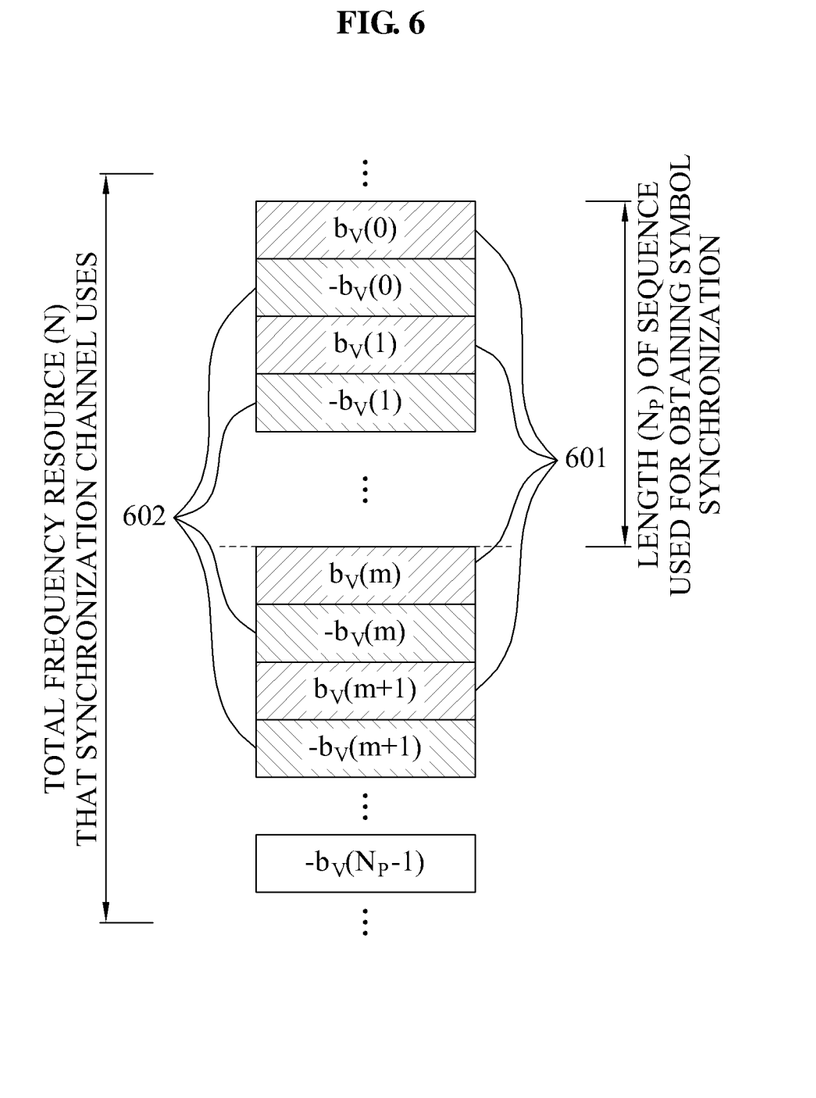
FIG. 6 is a diagram illustrating a state where a sequence element is assigned to a transmission frame according to a synchronization pattern generated, according to a fifth example embodiment.

FIG. 6 is a diagram illustrating a state where a sequence element is assigned to a transmission frame according to a synchronization pattern generated, according to a fifth example embodiment.

As illustrated in FIG. 6, the synchronization pattern generated according to the fifth example embodiment of the present invention may assign a base sequence $b_V(k)$ 601 calculated according to Equation 5 to an even-numbered positioned sub-carrier for transmitting a synchronization channel, and assign $-b_V(k)$ 602 generated by multiplying the base sequence $b_V(k)$ 601 by '-1' as a modified sequence $c_V(k)$ to an odd-numbered positioned sub-carrier for transmitting the synchronization channel. In this instance, the $c_V(k)$ 602 is calculated based on Equation 7 as given below.

$$c_V(k) = -(b_V(k-1)) = -e^{-j\frac{\pi V \lfloor k/2 \rfloor(\lfloor k/2 \rfloor+1)}{N_P}}, \quad \text{[Equation 7]}$$
$$k = 1, 3, 5, \ldots$$

Figure 7:
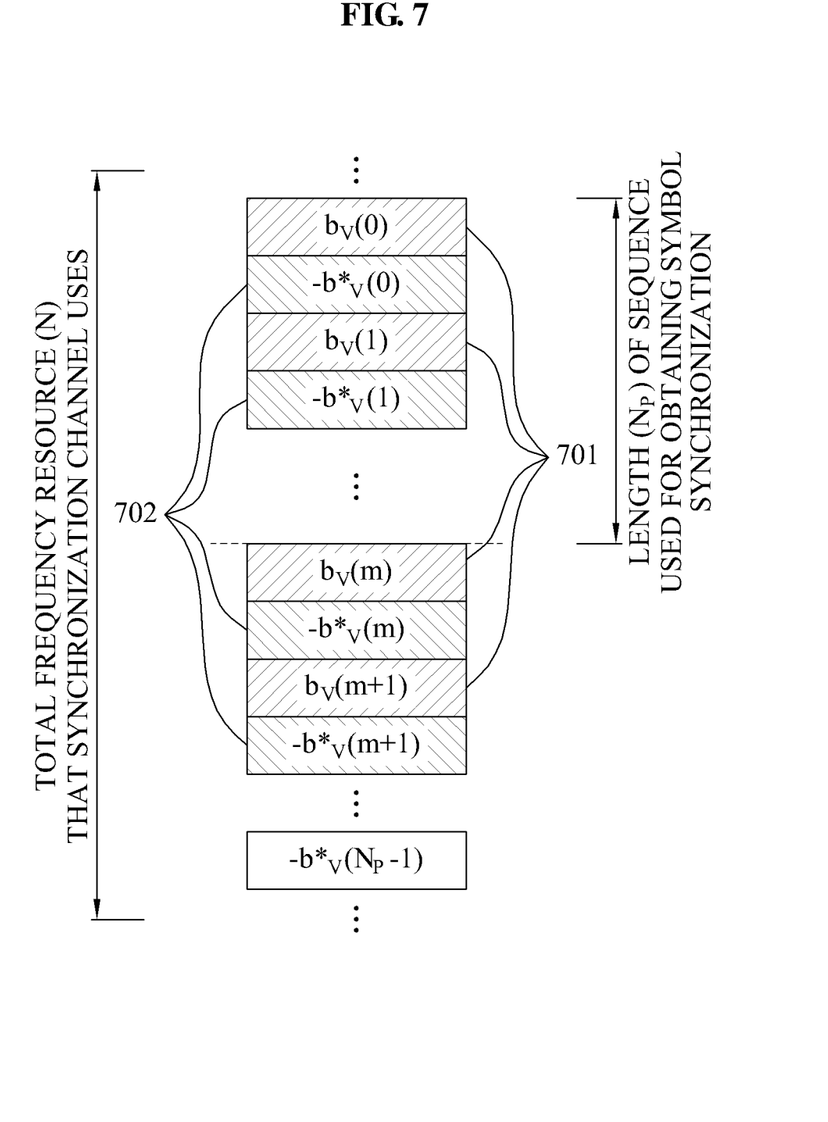
FIG. 7 is a diagram illustrating a state where a sequence element is assigned to a transmission frame according to a synchronization pattern generated, according to a sixth example embodiment.

FIG. 7 is a diagram illustrating a state where a sequence element is assigned to a transmission frame according to a synchronization pattern generated, according to a sixth example embodiment.

As illustrated in FIG. 7 the synchronization pattern generated according to the sixth example embodiment of the present invention may assign a base sequence $b_v(k)$ 701 calculated according to Equation 5 to an even-numbered positioned sub-carrier for transmitting a synchronization channel, and assign $b_v^*(k)$ 702 generated by conjugating ('*') the base sequence $b_v(k)$ 701 as a modified sequence $c_v(k)$ to an odd-numbered positioned sub-carrier for transmitting the synchronization channel. In this instance, the $c_v(k)$ 702 is calculated based on Equation 8 as given below.

$$c_v(k) = -(b_v(k-1))^* = -e^{j\frac{\pi V \lfloor k/2 \rfloor (\lfloor k/2 \rfloor + 1)}{N_p}}, \quad \text{[Equation 8]}$$
$$k = 1, 3, 5, \ldots$$

Figure 8:
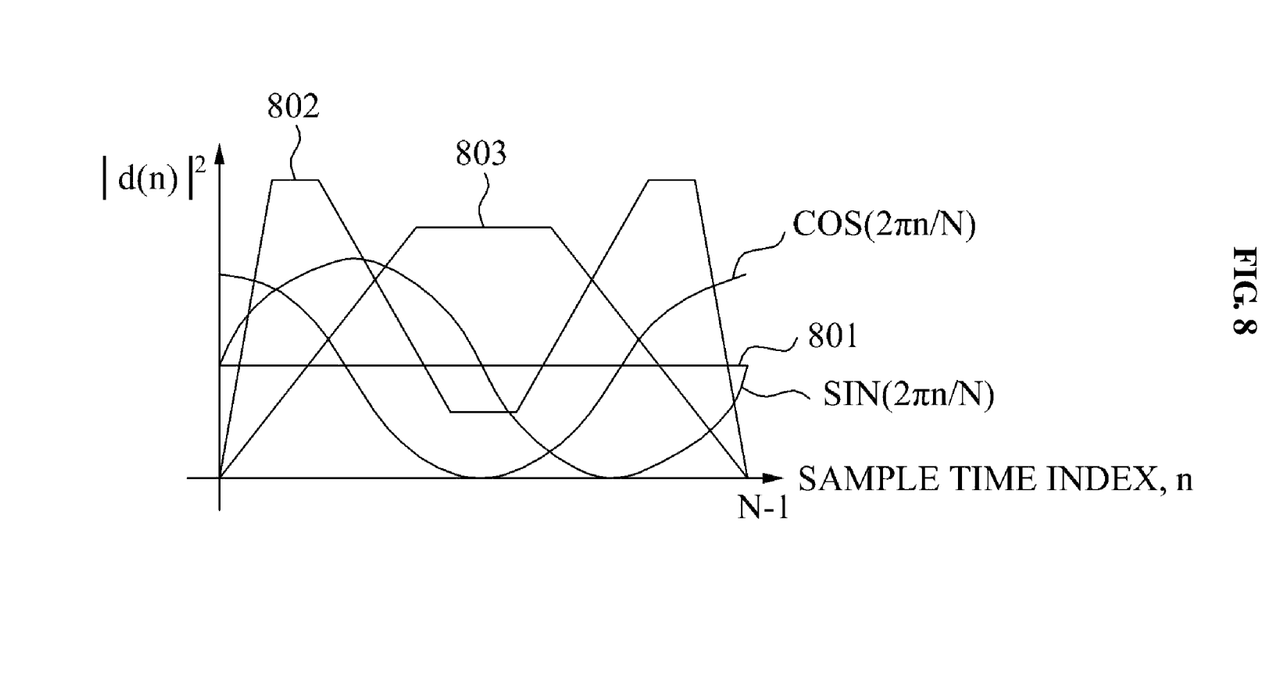
FIG. 8 is a diagram illustrating an example of a size pattern of a time area signal of a synchronization channel symbol section that is generated from a transmitting apparatus.

FIG. 8 is a diagram illustrating an example of a size pattern of a time area signal of a synchronization channel symbol section that is generated from a transmitting apparatus.

FIG. 8 illustrates a conventional symbol synchronization estimating method and a power waveform $(=|d(n)|^2)$ 801, 802, and 803 of a time area signal $(=d(n))$ in the second example embodiment and the fifth example embodiment.

In this instance, n may be a sample time index.

As illustrated in FIG. 8, the waveform 801 of the conventional symbol synchronization estimating method has a flat envelope during a synchronization channel symbol section, the waveform 802 of the second embodiment is a concave shape, and the waveform 803 of the fifth embodiment is a convex shape.

In this instance, the frequency mapping unit 103 may use a setup for adjusting a matching position, thereby enabling the power waveform not to be flat similar to the waveform 801 of the conventional symbol synchronization estimating method.

In this instance, the frequency mapping unit 103 may set the power waveform to form a convex form, a concave form, or an asymmetric pattern.

Figure 9:
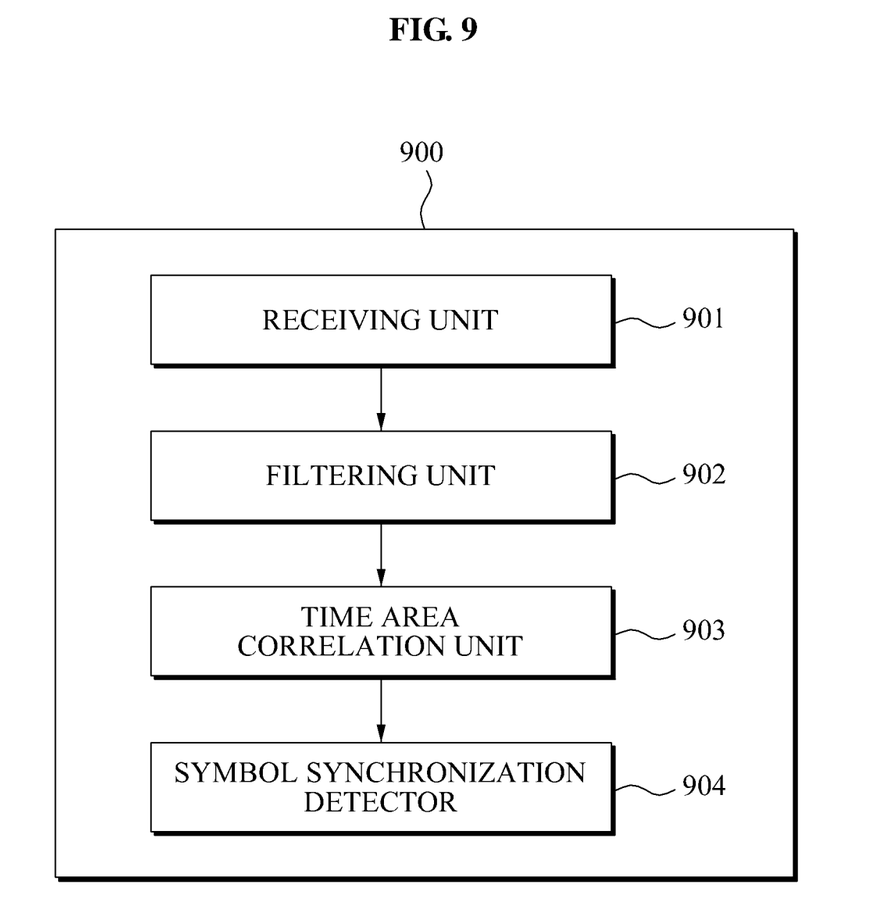
FIG. 9 is a recapitulative diagram illustrating a symbol synchronization obtaining and receiving apparatus robust to a frequency offset in a cell search of a wireless communication system according to an embodiment of the present invention.

FIG. 9 is a recapitulative diagram illustrating a symbol synchronization obtaining and receiving apparatus 900 robust to a frequency offset in a cell search of a wireless communication system according to an embodiment of the present invention.

Referring to FIG. 9, in the symbol synchronization obtaining and receiving apparatus 900 robust to the frequency offset in the cell search of the wireless communication system according to an embodiment of the present invention, a receiving unit 901 receives a transmission frame, a filtering unit 902 performs filtering of the transmission frame by a same amount of bandwidth assigned to a synchronization channel, a time area correlation unit 903 performs correlation between a time area signal of a synchronization channel symbol section stored in advance and a received sample time signal included in the transmission frame to calculate a correlation value of each sample time, and the symbol synchronization detector 904 determines a sample time having a highest correlation value as the symbol synchronization.

In this instance, when it is assumed that the transmission frame received by the receiving unit 901 has no fading and only has additional noise, the received transmission frame is expressed as Equation 9 as given below.

$$r(n) = d(n)e^{j\frac{2\pi \Delta f n}{N}} + w(n), n = 0, 1, \ldots, N-1 \quad \text{[Equation 9]}$$

In this instance, $d(n)$ is a time area signal, $r(n)$ is the received transmission frame, $w(n)$ is additional noise, and $\Delta f$ is a frequency offset.

In this instance, the time area correlation unit 903 may calculate the correlation value of each sample time based on Equation 10 assuming the symbol synchronization sample time is a complete symbol synchronization sample time.

$$C = \left|\sum_{n=0}^{N-1} r(n)d^*(n)\right|, \quad n = 0, 1, \ldots, N-1 \quad \text{[Equation 10]}$$
$$= \left|\sum_{n=0}^{N-1} |d(n)|^2 e^{j\frac{2\pi \Delta f n}{N}}\right| = |C_1 + jC_Q|$$

where $C_1 = \sum_{n=0}^{N-1} |d(n)|^2 \cos\left(\frac{2\pi \Delta f n}{N}\right)$, $$C_Q = \sum_{n=0}^{N-1} |d(n)|^2 \sin\left(\frac{2\pi \Delta f n}{N}\right)$$

Figure 10:
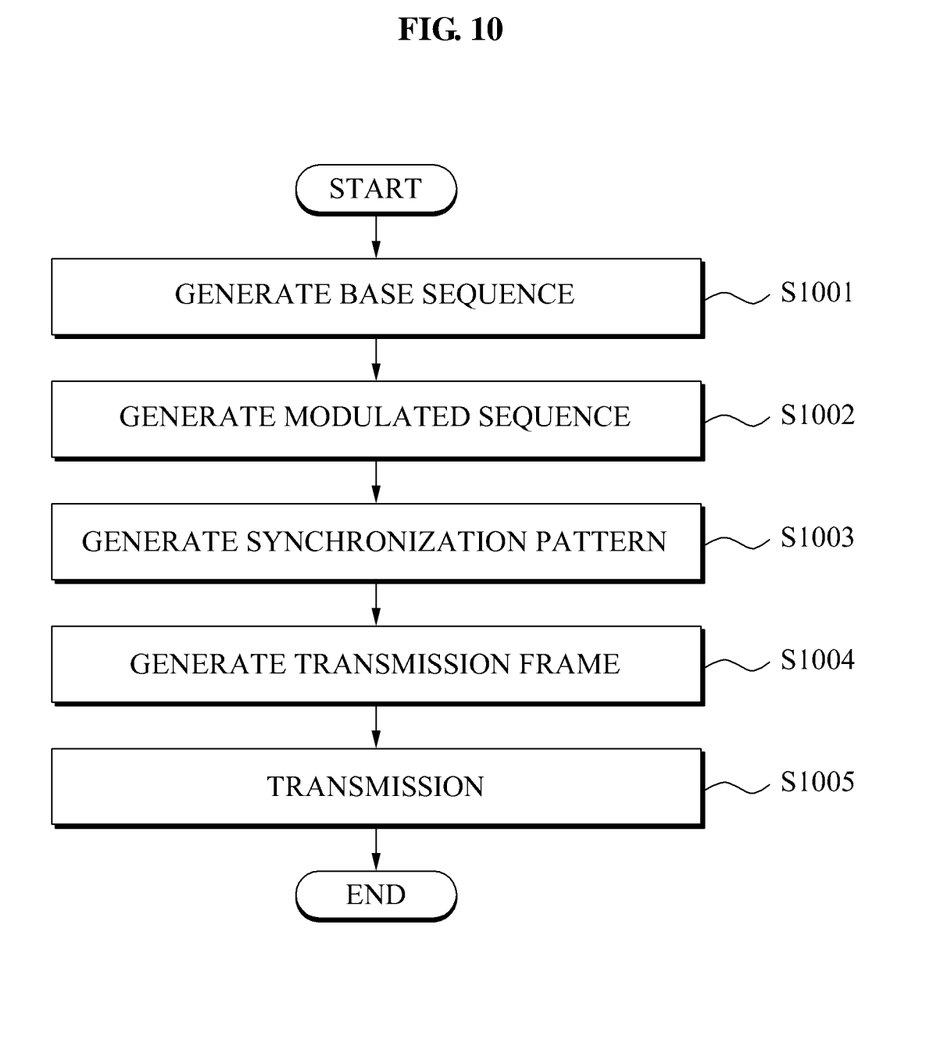
FIG. 10 is a flowchart illustrating a symbol synchronization obtaining and transmitting method robust to a frequency offset in a cell search of a wireless communication system according to an embodiment of the present invention.

FIG. 10 is a flowchart illustrating a symbol synchronization obtaining and transmitting method robust to a frequency offset in a cell search of a wireless communication system according to an embodiment of the present invention.

In operation S1001, the sequence generator 101 generates a base sequence for obtaining a symbol synchronization.

In operation S1002, the pattern generator 102 generates a modified sequence based on the base sequence generated in operation S1001.

In operation S1003, the pattern generator 102 combines the base sequence generated in the operation S1001 and the modified sequence generated in operation S1002 to generate a synchronization pattern.

In operation S104, the frequency mapping unit 103 performs mapping transmission information to a time area and a frequency area based on the synchronization pattern generated in operation S1003, for generating a transmission frame.

In this instance, the frequency mapping unit 103 may set a size pattern of a time area signal of a synchronization channel symbol section included in the transmission frame not to be flat, for generating the transmission frame.

In operation S1005, the transmitting unit 104 transmits the transmission frame generated in operation S1004.

Figure 11:
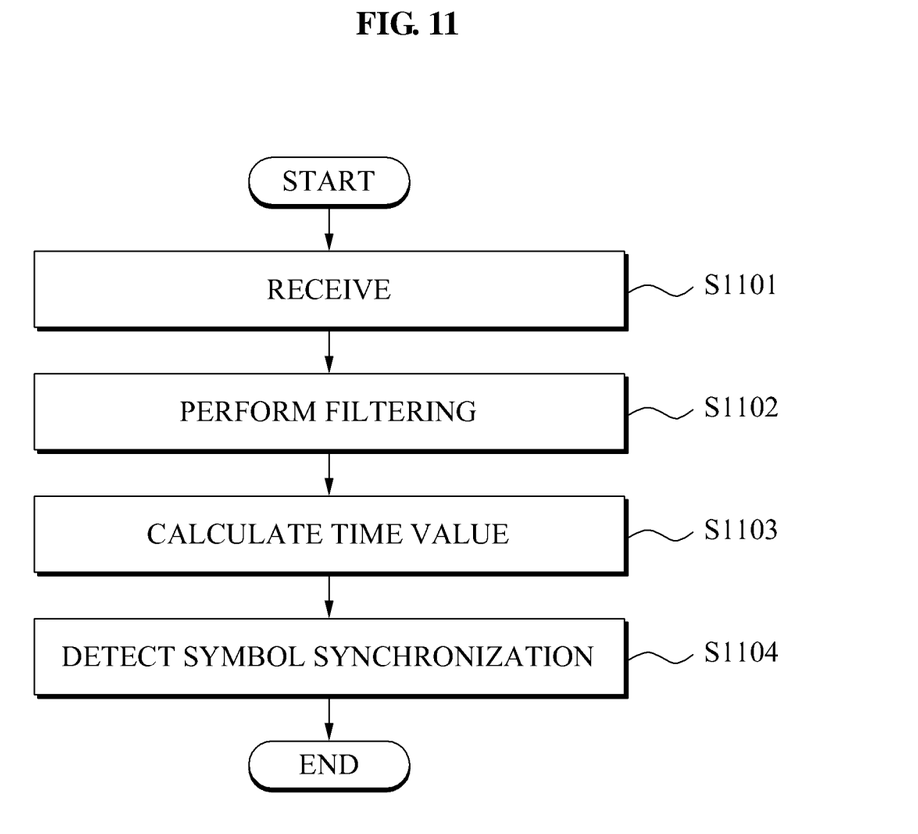
FIG. 11 is a flowchart illustrating a symbol synchronization obtaining and receiving method robust to a frequency offset in a cell search of a wireless communication system according to an embodiment of the present invention.

FIG. 11 is a flowchart illustrating a symbol synchronization obtaining and receiving method robust to a frequency offset in a cell search of a wireless communication system according to an embodiment of the present invention.

In operation S1101, the receiving unit 901 receives a transmission frame transmitted from the transmitting unit 104.

In operation S1102, the filtering unit 902 performs filtering of the received transmission frame received in operation S1101 by a same amount of bandwidth assigned to a synchronization channel.

In operation S1103, a time area correlation unit 903 performs correlation between a time area signal of a synchronization channel symbol section stored in advance and the received transmission frame filtered in operation S1002, for calculating a correlation value of each sample time.

In operation S1104, the symbol synchronization detector 104 determines a sample time having a highest correlation value calculated in operation S1103, as the symbol synchronization.

According to the present invention, the symbol synchronization obtaining apparatus robust to a frequency offset in a cell search of a wireless communication system combines a base sequence and a sequence modified based on the base sequence to generate a synchronization pattern for obtaining symbol synchronization, assigns the synchronization pattern to a synchronization channel, thereby efficiently estimating symbol synchronization and reducing a complexity of a receiving apparatus, even though a PAPR increases by a small amount.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmitting method, comprising:
   mapping information to first symbols;
   assigning a first sequence including the first symbols to first sub-carriers;
   deriving second symbols, each from one of the first symbols;
   assigning a second sequence including the second symbols to second subcarriers; and
   transmitting the information included in the first sequence and the second sequence using the first sub-carriers and the second sub-carriers;
   wherein a ratio between the first sequence and the second sequence is 1:1, and
   wherein the first sub-carriers are non-overlapped with the second sub-carriers.

2. The method of claim 1, wherein each of the second symbols is derived from each of the first symbols by applying complex conjugation to each of the first symbols.

3. The method of claim 1, wherein each of the second symbols is derived from each of the first symbols by multiplying each of the first symbols by −1 or 1.

4. The method of claim 1, wherein each of the second symbols is derived from each of the first symbols by applying, to each of the first symbols, complex conjugation and multiplying by −1.

5. The method of claim 1, wherein the first sub-carriers are even sub-carriers, and the second sub-carriers are odd sub-carriers.

6. The method of claim 1, wherein the first sub-carriers are odd sub-carriers, and the second sub-carriers are even sub-carriers.

7. The method of claim 1, wherein the first sub-carriers are upper sub-carriers, and the second sub-carriers are lower sub-carriers.

8. The method of claim 1, wherein the first sub-carriers are lower sub-carriers, and the second sub-carriers are upper sub-carriers.

9. The method of claim 1, wherein a number, M, of the second symbols are derived from one of the first symbols, wherein M is a natural number.

10. A receiving method of a receiving apparatus, comprising:
    receiving first sub-carriers assigned to a first sequence including first symbols mapped to information, and second sub-carriers assigned to a second sequence including second symbols derived from the first symbols;
    extracting the first symbols from the first sequence, and the second symbols from the second sequence; and
    estimating the information from the extracted first and second symbols;
    wherein a ratio between the first sequence and the second sequence is 1:1, and
    wherein the first sub-carriers are non-overlapped with the second sub-carriers.

11. The method of claim 10, wherein each of the second symbols is derived from each of the first symbols by applying, to each of the first symbols, at least one of (1) complex conjugation, (2) multiplying by −1, or (3) multiplying by 1.

* * * * *